May 5, 1931.                T. HILL                1,803,431
PLATE HOLDER
Filed Feb. 24, 1930
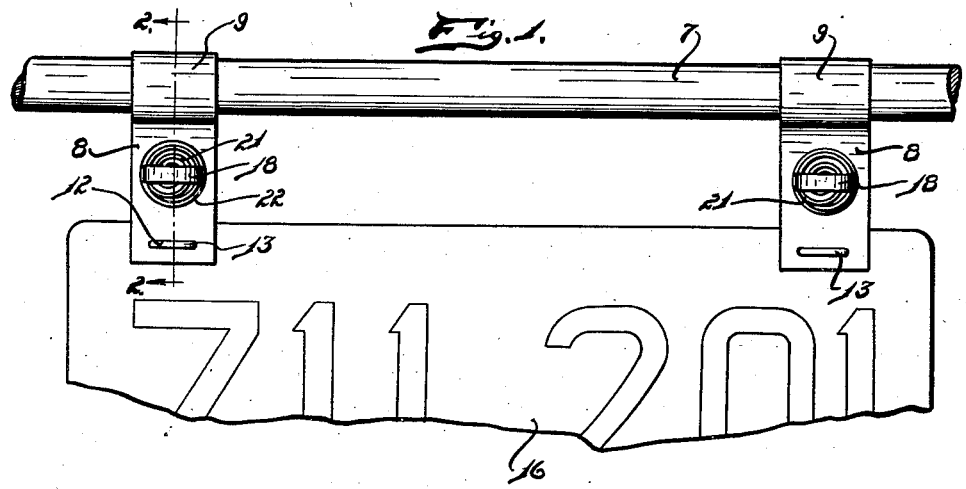
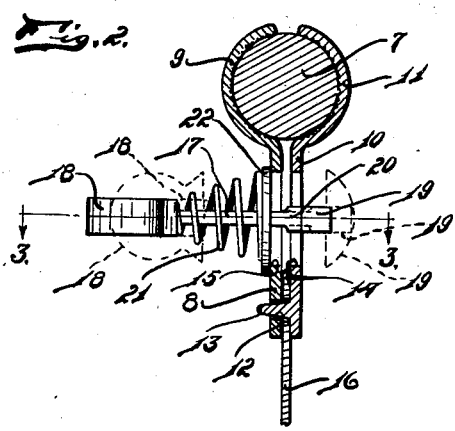
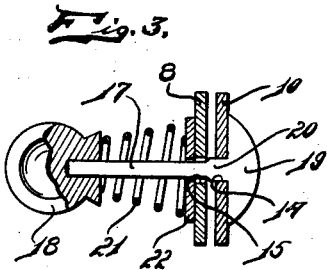
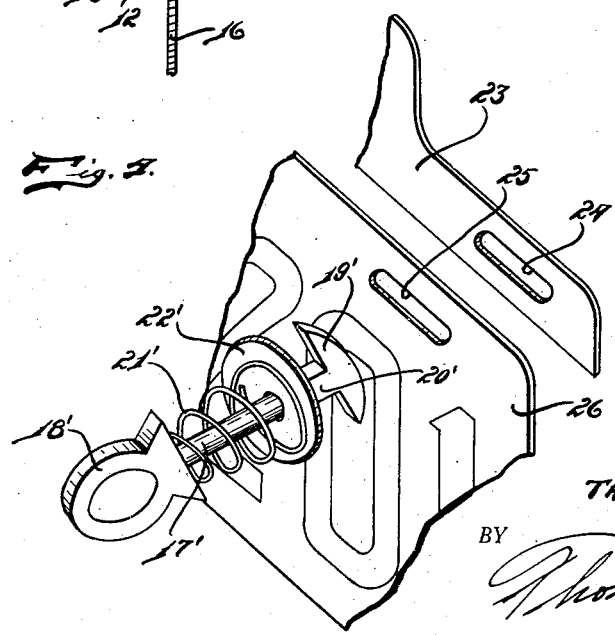
INVENTOR.
Thomas Hill
BY
*Thos. S. Donnelly*
ATTORNEY.

Patented May 5, 1931

1,803,431

UNITED STATES PATENT OFFICE

THOMAS HILL, OF DETROIT, MICHIGAN

PLATE HOLDER

Application filed February 24, 1930. Serial No. 430,657.

My invention relates to a new and useful improvement in a plate holder particularly adapted for use as a means for attaching a license plate to a supporting body. It is an object of the present invention to provide a device of this class which will be simple in structure, economical of manufacture and highly efficient in use.

Another object of the invention is the provision of a plate holder of this class whereby an axially movable retaining member may be spring held in operative position and also prevented from rotating to inoperative position.

Other objects will appear hereinafter.

The invention consists in the combination and arrangement of parts hereinafter described and claimed.

The invention will be best understood by a reference to the accompanying drawings which form a part of this specification and in which, Fig. 1 is a front elevational view of the invention showing it in use.

Fig. 2 is a sectional view taken on line 2—2 of Fig. 1.

Fig. 3 is a sectional view taken on line 3—3 of Fig. 2.

Fig. 4 is a fragmentary perspective view in separated relation of a plate, a supporting bracket, and a modified form of the invention.

In the form shown in Fig. 1, I propose to suspend the license plate 16 from the supporting rod 7 and to this end I provide a plate 8 having the semi-circular end 9 which serves with the semi-circular end 11 of the plate 10 to clamp the supporting rod 7.

The plate 10 is provided with an elongated slot 14 which is in registration with the elongated slot 15 formed in the plate 8 when the tit or forward projection 13 on the plate 10 is projected through the opening 12 formed in the plate 8. This projection 13 also projects through an opening formed in the license plate 16. Thus the plates 8 and 10 serve to clamp about the supporting rod 7 and at the same time clamp the plate 16 so as to support it. A retaining mechanism for retaining these parts in the position shown in Fig. 2 comprises the stud or bolt 17 having at one end the head 18 and at the opposite end the head 19 which is comparatively narrow and projects laterally from opposite sides of the stud 17, the stud 17 being provided with the squared neck 20 of sufficient size that when it is engaged in the slot 14 a rotation of the stud 17 cannot be effected. A spring 21 embraces the stud 17 and engages at one end the head 18 and at the opposite end the washer 22 so that the flat sided neck 20 is normally retained in engagement in the slot 14. When it is desired to remove the stud 17 from its operative position shown in full lines in Fig. 2, it is but necessary to move the stud 17 axially against the compression of the spring 21 into the dotted line position shown in Fig. 2 so that the stud 17 may be rotated through 90 degrees to bring the head 19 into registration with the slots 14 and 15. Thereupon the head 19 may be drawn through the slots and the plates 8 and 10 moved into separated relation to release the plates 16 and to release the portions 9 and 11 from clamping relation about the rod 7. In assembling the parts the operation is the reverse of that described. The spring is of sufficient tension to prevent rattling of the parts or undue separation of the plates 8 and 10 when in use.

With a plate mounting of this type it is evident that an easy and quick mounting of the license plate in position may be effected.

In the form shown in Fig. 4, the bracket 23 is illustrated and this bracket is of a type commonly found on automobiles as standard equipment. The bracket is provided with the elongated slot 24 which may be brought into alignment with the slot 25 formed in the license plate 26. The stud 17' is provided with the head 19', the flat sided neck 20', the washer 22', the spring 21' and the head 18'. In mounting the license plate on the bracket, the head 19' is projected through the slots 24 and 25 thus bringing the washer 22' into engagement with the face of the plate 26. The stud 17' may then be turned through 90 degrees so as to extend the head 19' at right angles to the slots 24 and 25 upon which the flat sided neck 20' will be drawn by the spring 21' into the slot 24 so that rotation of the stud will be prevented.

While I have illustrated and described the preferred form of my invention, I do not wish to limit myself to the precise details of structure shown but desire to avail myself of such variations and modifications as may come within the scope of the appended claims.

Having thus described my invention, what I claim as new and desire to secure by Letters Patent is:

1. A device of the class described, comprising: a pair of plates each having at one end a bulged portion and clamping about a supporting body, each of said plates having a slot formed therein, said slots being in alignment with each other, and one of said plates having an opening formed therein; a projection extending outwardly from the other of said plates and projectable into said opening; a retaining member comprising an elongated stem portion having one end thereof provided with flat faces upon the engagement of which in said slots the rotation of said stem is prevented; a head on said end of said stem projectable through said slots when in alignment therewith; and a spring positioned on said stem adapted to retain said head when projected through said slots and rotated out of alignment therewith in engagement with one of said plates and serving to resist relative movement of said plates.

2. A device of the class described, comprising: a pair of plates each having a slot formed therein, said slots being in alignment with each other, and one of said plates having an opening formed therein; a projection extending outwardly from the other of said plates and projectable into said opening; a retaining member comprising an elongated stem portion having one end thereof provided with flat faces upon the engagement of which in said slots the rotation of said stem is prevented; a head on said end of said stem projectable through said slots when in alignment therewith; and a spring positioned on said stem adapted to retain said head when projected through said slots and rotated out of alignment therewith in engagement with one of said plates and serving to resist relative movement of said plates.

In testimony whereof I have signed the foregoing specification.

THOMAS HILL.